United States Patent [19]

Swanson et al.

[11] Patent Number: 4,496,976

[45] Date of Patent: Jan. 29, 1985

[54] REDUCED MEMORY GRAPHICS-TO-RASTER SCAN CONVERTER

[75] Inventors: Ronald L. Swanson; Lyle R. Strathman, both of Cedar Rapids, Iowa

[73] Assignee: Rockwell International Corporation, El Segundo, Calif.

[21] Appl. No.: 453,013

[22] Filed: Dec. 27, 1982

[51] Int. Cl.[3] .......................... H04N 7/04; H04N 5/22

[52] U.S. Cl. .................................... 358/147; 358/183; 340/744

[58] Field of Search ................ 358/183, 147; 340/728, 340/744, 748, 749, 750, 802

[56] References Cited

U.S. PATENT DOCUMENTS

| | | | |
|---|---|---|---|
| 3,787,819 | 1/1974 | Busink | 364/900 |
| 3,818,482 | 6/1974 | Yoshida et al. | 340/744 |
| 3,872,461 | 3/1975 | Jarosik et al. | 340/748 |
| 3,894,292 | 7/1975 | Wilkinson et al. | 340/747 |
| 3,952,297 | 4/1976 | Stauffer et al. | 340/740 |
| 3,976,831 | 8/1976 | Danell et al. | 358/138 |
| 3,996,585 | 12/1976 | Hogan et al. | 340/747 |
| 4,011,556 | 3/1977 | Tochitani | 340/744 |
| 4,052,719 | 10/1977 | Hutt et al. | 354/147 |
| 4,081,797 | 3/1978 | Olson | 340/748 |
| 4,233,628 | 11/1980 | Ciciora | 358/147 |
| 4,298,891 | 11/1981 | Baba et al. | 358/183 |
| 4,325,063 | 4/1982 | Herman | 340/750 |
| 4,409,617 | 10/1983 | Whitehead et al. | 358/147 |

*Primary Examiner*—Howard W. Britton
*Assistant Examiner*—John K. Peng
*Attorney, Agent, or Firm*—George A. Montanye; H. Fredrick Hamann

[57] ABSTRACT

A system and technique is disclosed which enables a reduction in memory for the display of superimposed data (alpha-numerics, symbols and graphics) in an all-raster scanned display. A video signal containing information to be displayed on a video monitor by raster scanning techniques is multiplexed with the output of a storage device containing information representing data for controlling the intensity of specific points on the monitor during the raster scan. The intensity is controlled by the signals from memory to produce data on the video monitor as an overlay to the normal video display produced by the video signal. In one embodiment, the storage device is formed by two separate memory areas having a size substantially less than the total number of lines forming one raster field of the video display. The first memory area is multiplexed with the video signal while the second memory area is being filled and the second memory area is multiplexed with the video signal while the first memory area is being filled. This process is repeated a predetermined number of times for each field scan of the video display.

9 Claims, 3 Drawing Figures

REDUCED MEMORY GRAPHICS-TO-RASTER SCAN CONVERTER

BACKGROUND OF THE INVENTION

The present invention relates to the display of data (alpha-numerics, symbols and graphics) by use of an all-raster scan and more particularly to the superposition of data by modulating the all-raster scan of a cathode ray tube (CRT).

Video displays are now commonly used in connection with a wide variety of electronic instruments and systems including TVs, avionics equipment, word processing and computer displays, and a multitude of additional business and consumer equipment. In many video systems and particularly those similar to conventional TV systems using CRTs, the video displays are formed by the generation of an analog video signal which is in turn coupled to and synchronized with the raster scan of a CRT to control the intensity, and therefore the visual image, produced on the face of the CRT.

In some systems, visual images are displayed without the use of raster scan by a technique commonly known as stroke-writing. Stroke-writing employs a system wherein the deflection of an electron beam is moved about the face of a CRT much like the movement of a pencil to enable the continuous tracing of characters, symbols, or other information to be displayed. In this instance, the information is not generated as a series of intensity-modulated positions on the raster scan, but rather by a continuously moving and modulated electron beam defining the specific display patterns.

As might be expected, the technology has evolved even further resulting in hybrid systems, wherein the benefits of stroke-writing and raster scanning are combined. In such systems, video information is displayed during the raster scan and superimposed data is displayed by stroke-writing during the vertical retrace time of the raster scan. While such hybrid systems are highly desirable, the amount of information that can be displayed over the raster scan is significantly affected by the time of the vertical retrace. There is, therefore, a finite amount, and in various applications a too-restrictive amount, of information that can be displayed.

As will be appreciated, although stroke-written information tends to produce more visually acceptable displays, more power is required than that associated with conventional raster scans. Also, since raster scan techniques have long existed, many video systems are already equipped to display information by use of a raster scan. Accordingly, while stroke-written and raster techniques are highly developed, there has still been a continuing search for alternatives to stroke-written or hybrid displays.

One such technique includes the superposition of data by intensity modulating portions of the CRT during the raster scan to produce an all-raster CRT display. This system utilizes a predetermined memory space to store the information representing the data for each scan of the raster frame and to update that information for the next scan. The information stored in memory is used to control the intensity-modulation and form the superimposed data. Such systems reduce the power required to produce superimposed data on an all-raster display but, in doing so, sacrifice some of the clarity normally associated with stroke-written data. However, in certain instances the reduced cost and power savings make such an all-raster system more desirable than any of the stroke-written or hybrid systems.

One of the drawbacks to an all-raster system displaying superimposed data is the memory space required to store the data so that it may be displayed during the raster scan. While a variety of techniques for storing data during a raster scan are known, as evidenced by reference to U.S. Pat. Nos. 3,787,819; 3,894,292; 4,052,719; and 4,011,556, there is still a need to reduce the memory space required for producing superimposed data. In particular, U.S. Pat. No. 3,787,819 describes a conventional system capable of generating data on a video monitor. In connecton with that display, a plurality of cyclic sub-memories are used equal in number to the maximum number of lines of text to be displayed on the video monitor. While this patent and the other referenced patents broadly describe the technology of the prior art, and in some cases work toward reducing the memory required in such systems, there is still a continuing need for other alternatives for reducing memory and thereby the cost of all-raster scanned systems.

Accordingly, the present system and techniques has been developed to overcome the specific shortcomings of the above known and similar techniques and to provide a reduction in memory required to produce superimposed data displays in all-raster scanned video systems.

SUMMARY OF THE INVENTION

In accordance with the present invention, there is disclosed a system and technique capable of reducing the memory required to superimpose data (alphanumerics, symbols and graphics) on the video of a CRT display. A composite video signal is received and processed to separate the horizontal and vertical sync information from the video signal. A computer or other control system is coupled to provide information capable of defining data on a raster scan by intensity modulating specific points during the raster scan. In one embodiment, this information is coupled to dual memories having a size significantly less than that required to store information for one raster field scan. The sync information is utilized to control the computer or control system so that the data for a predetermined number of lines of a raster field is read into each of the memories and provided as output from each of those memories. The output from each of the memories is then alternately multiplexed with the analog video to produce a video signal intensity modulated at predetermined points to superimpose data on the visual image produced by the video signal on the face of the CRT. After the data for the predetermined number of raster lines stored by the first memory has been multiplexed with the video signal, the data from the second memory is multiplexed to produce a multiplexed video for the next predetermined number of lines of raster scan. Thereafter, while one memory is being read to produce the superimposed video, the other memory is being written with the data required for the next predetermined number of sequential lines in the raster scan. Reading and writing by the alternate memories is continuous to produce the output forming the superimposed data for each frame of the raster. This alternating process of writing and reading from a storage or memory area enables a significant reduction in the memory space required for an all-raster display.

It is therefore a feature of the present invention to provide an all-raster scan video system having reduced memory requirements.

It is a further feature of the invention to provide superimposed data in an all-raster scanned video display system.

Yet another feature of the invention is to provide dual memories in an all-raster scanned video display system for producing superimposed data with reduced memory requirements.

A still further feature of the invention is to provide alternative reading and writing of memories having storage areas with a capacity substantially less than the number of lines forming a complete raster field scan.

Another feature of the invention is to provide a simplified configuration of memory for enabling data to be superimposed on a video signal by use of an all-raster scan with intensity modulation.

These and other advantages and novel features of the invention will become apparent from the following detailed description when considered with the accompanying drawings wherein:

DETAILED DESCRIPTION OF A PREFERRED EMBODIMENT

Figure 1:
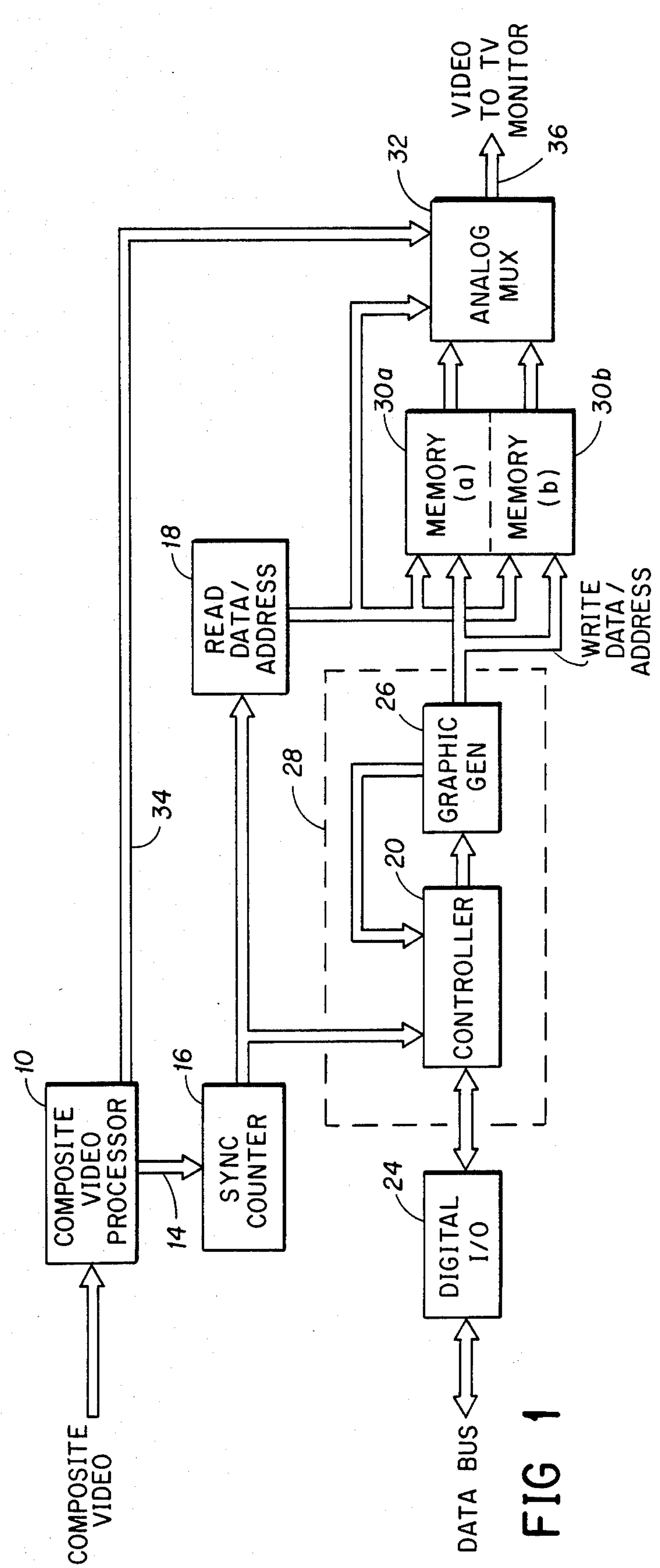
FIG. 1 is a block diagram depicting an all-raster scan system for displaying video data with superimposed data in accordance with the present invention.

Referring now to the drawings, there is shown an all-raster scanned video system which superimposes the display of data on a conventional video display. For the purpose of describing the invention, the same will be discussed with respect to a conventional composite video signal as might normally be transmitted for use by television in connection with graphic generators or computer controllers designed to intensity modulate particular positions of the raster scan to superimpose data. As will be understood, the TV monitor may be a standard 525 line raster or any other number of raster lines as might normally be used in connection with a TV monitor. Also, the video monitor or screen will be described with respect to raster scanning by an interlaced field raster. This technique sequentially scans every other line (one field) over the face of the video monitor and, therafter, sequentially scans the alternate lines (another field) to produce the conventional interlaced effect for a frame of TV video. It will be apparent, however, that the inventive technique is equally applicable to any system employing similar scanning techniques.

As shown in FIG. 1, a composite video signal is provided as input to a composite video processor 10. The composite video signal includes a carrier with horizontal and vertical sync modulation as well as the analog video signal modulated on the carrier. The composite video processor 10 receives the video signal and demodulates the horizontal/vertical sync signals. The horizontal/vertical sync signals are provided as output 14 to a sync counter 16 which counts the sync signals in a conventional manner to enable control of the computer or character/graphics generator 28 in a similarly conventional manner.

The sync counter 16 provides its output to a read data/address control 18 as well as to a controller 20. The controller 20 is in turn coupled to an input-output device 24 and a character/graphics generator 26 which interfaces with the controller 20 to generate data for use in connection with the raster scan. The elements 20 and 26 may be conventional control and character/graphics generating elements known in the prior art, or may represent the devices of a computer system 28 which processes information and generates desired data displays. The digital input-output device 24 is also conventional and is coupled to transfer data to the computer 28 from a source of data by way of a data bus, or provide data processed by the computer 28 to other points in the video system by way of the data bus. The output of the system 28 is provided to dual storage devices **30*a* and 30*b* which also receive input from control 18. The memory devices 30*a* and 30*b* may be conventional RAM devices or other storage (memory) devices capable of storing a digital representation of the pattern representing the data to be superimposed on the video monitor. In this regard, the dual memories 30*a* and 30*b* include a plurality of storage locations corresponding to the lines on the video monitor on which data will be displayed. In accordance with the present invention, as will be subsequently described, memory 30*a* stores the data necessary to form that portion of the data appearing in a fractional sequence of every-other raster line and memory 30*b*** stores the data for a successive fractional sequency of alternate lines of the same raster field of the TV monitor.

The output from the memory devices **30*a* and 30*b*, is coupled to a conventional analog multiplexing device along with the composite video output 34 of the video processor 10. An output from control unit 18 is also provided to the analog multiplexer 32. The multiplexed analog video from the analog multiplexer 32 is then coupled from output 36** to form the composite video used to control the synchronization and intensity of the electron beam scanning the face of a CRT to cause a display of the analog video information with the superimposed data.

Except for the fractional storage, the above system has a configuration of prior known systems. Accordingly, it will be apparent that when data is to be superimposed on the analog video of the system, that data is first entered through an input device, for example, a keyboard, and is coupled by way of a data bus to a conventional input-output device 24 and thence to the computer system 28. The computer 28 thereafter processes the data to produce an output which is capable of storing appropriate digital information in the memory devices **30*a* and 30*b* for forming the desired configuration of data on the video display when the memory outputs from 30*a* and 30*b* are multiplexed with the video from processor 10. Sync counter 16 provides the timing sync necessary for the computer 28 system to process the data and cause a write (store) of that data into memory 30*a* or 30*b*. Control 18 in a similar manner performs the timing synchronization necessary for reading that data from the memories 30*a* and 30*b* at the appropriate times and combining that data in the analog multiplexer 32 with the composite video signal from 34**.

In its prior-known form, the system of FIG. 1 employs a memory **30*a* and 30*b* of identical configuration. The memory 30*a* is constructed to have a storage capacity for one raster field which is equal to the number of bit positions needed to define the length of a raster line and a number of lines equal to every-other line (½) of the total number of raster lines forming a frame of the video monitor. Memory 30*b*** likewise required a capacity equal to the number of bit positions needed to store one raster field. However, in accordance with the present invention, the storage required for the display of superimposed data in a raster field display can be reduced in accordance with the inventive technique.

Figure 2:
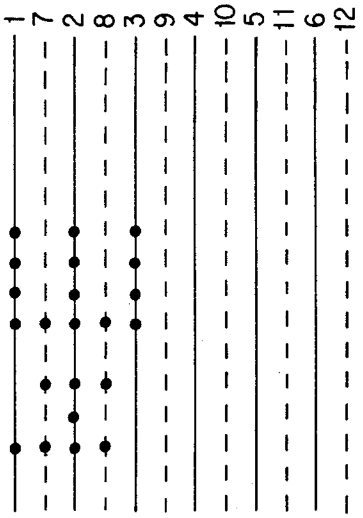
FIG. 2 is a diagram schematically depicting the scanning produced by a raster scanned CRT.

Referring to FIG. 2, an exemplary raster pattern as might appear on a video monitor of a typical TV CRT, is shown. In this example, the number of raster lines has been reduced to 12 for simplicity and defines the frame in which the data will be displayed. In normal operation, using the interlace technnique, the raster lines are alternately scanned across the screen and the analog video information is provided to the first raster field (lines 1–6 in FIG. 2). After these lines have been scanned by the electron beam, the in-between lines (lines 7–12 in FIG. 2) are scanned by the electron beam to produce a complete frame of video imagery on the face of the CRT. This scanning of alternate lines is known as the interlace technique and is well known in the prior art as is apparent from the previously-mentioned patents herein incorporated by reference in their entirety.

In accordance with prior-known techniques, the data for one entire raster field is generated by computer and system 28 and stored in memory **30*a* which outputs a signal for modulating alternate lines (lines 1–6) as they are sequentially scanned. This output signal from memory 30*a* produces an intensity modulation which when combined with the intensity-modulation produced by the signals from memory 30*b* during the scan of the successive alternate lines forming a second field (lines 7–12), will produce the desired superimposed data. Thus, the signals from memory 30*a* control the intensity-modulation during the scanning of lines 1–6 and the signals from memory 30*b* control the intensity-modulation during the scanning of lines 7–12. When the intensity-modulating signals from either memory 30*a* or memory 30*b* are combined in the analog multiplexer 32 with the composite video signal from 34, the net output 36 provided to the video monitor is an all-raster scanned video image with composite generated data (shown as black dots in FIG. 2) superimposed on the video due to the intensity-modulating signals provided by memories 30*a* and 30*b*. Naturally, the sync counter 16 controls the writing of the data into memories 30*a* and 30*b* while the read data/address control 18 controls the reading of the output from that memory to the analog multiplexer 32**.

In the operation of the prior-known system, the sync counter 16 first signals the computer system 28 to write the data for lines 1–6 into memory **30*a* and the data for lines 7–12 into the memory 30*b*. Thereafter, the read data/address control 18 initiates a readout of memory 30*a* to the analog multiplexer 32 for the scanning of lines 1–6. Memory 30*b* may receive data from computer system 28 during this time, but only one memory is coupled to read through multiplexer 32 during any time period. Once the scan of lines 1–6 has been completed, read control 18 disconnects the output of memory 30*a* from the analog multiplexer 32 and couples memory 30*b* to the multiplexer 32 for the scan of lines 7–12. Again, as memory 30*b* is read through multiplexer 32, memory 30*a* may receive data from computer system 28 but it will not have its output coupled to multiplexer 32. Thus, during the time that one memory is being read (output through multiplexer 32), the other memory is being refreshed by receiving data from computer system 28** to reflect any changes that may be necessary to update the data for subsequent scans. This process is repeated for each scan of the raster with each memory essentially storing one field of the raster to allow display of the data for each frame on the TV monitor.

As will be understood, since the display is divided into two fields for providing the interlace, one field (lines 1–6) is being drawn on the CRT (read from memory) while the other field (lines 7–12) is being written from the computer system 28. The two memories required are thus identical and may have very large storage capacities depending upon the number of lines and line length of the raster forming the video monitor. By way of example, if it is desired to display data on a typical TV monitor, which data is to have a 512×512 horizontal/vertical picture resolution simultaneous with the incoming composite video signal, the first field would require 512 bits×256 lines to define the raster field. Likewise, the second field would require 512 bits×256 lines to define the alternate lines of the raster frame. The total bit count is then 512×256×2×1 for two shades of intensity resolution obtained by the on/-off capability of the bit memory. If 4096 RAMs are used for the memory elements, a total of 512×256×2×1=4096 or 64 DIPs (dual in-line packages) are required. As will be appreciated, if it is desired to provide data with different shades of gray or in multiple colors, more storage bits are required to define the control words. Thus, for four shades of gray, 128 DIPs would be needed. Likewise, if eight shades of gray were required, 256 DIPs would be needed. As will be appreciated, by using two memories, each with a size of one raster field, significant memory space is needed to accomplish the intensity modulation necessary for the superposition of data on the analog video.

In accordance with the present invention, the above-described system is modified to provide a significant reduction in memory space with little or no sacrifice in the display of information. In contrast to stroke written systems, the present technique provides a savings in power and cost of memory. This is accomplished by reducing the size of the memories **30*a* and 30*b* needed to store information, to a fractional number of the raster lines forming a raster field. By way of example, memory 30*a* may be reduced in the example of FIG. 2 from a six-line capacity to a three-line capacity. Memory 30*b* may be likewise reduced from a six-line capacity to a three-line capacity. Thereafter, the computer 28 may be controlled to generate (in response to sync counter 16) the data necessary for lines 1–3 and store that information in memory 30*a*. Likewise, the information necessary to define the data in lines 4–6 may be generated by computer 28 and stored in memory 30*b*. While memory 30*a* is multiplexed through analog multiplexer 32 (under the control of 18) for the scan of lines 1–3, the information necessary to define the data in lines 4–6 may be generated by computer 28 and stored in memory 30*b*. Memory 30*b* is then multiplexed through 32, while memory 30*a* is receiving data from computer 28 for lines 7–9. Thereafter, memory 30*a* is again multiplexed through 32 to scan lines 7–9 while memory 30*b* receives data from computer 28 for raster lines 7–12. Finally, memory 30*b* is coupled to multiplexer 32 to supply the data for lines 7–12 to multiplexer 32 and complete the raster frame while memory 30*a* receives the first fractional field of the next frame. The alternate writing and reading from the memories 30*a* and 30*b* continues sequentially for each raster frame. As is apparent from the above, memory 30***a* provides that data which will be displayed for a fraction of a raster field and memory 30*b* provides that data which will be displayed for a successive fraction of the raster field. This alternate process is continued for each field and each frame of the raster scan.

Figure 3:
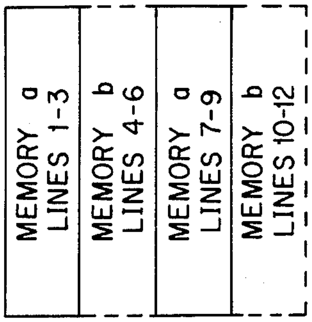
FIG. 3 is a diagram illustrating the sequential addressing of memory in accordance with the invention as employed in FIG. 1.

FIG. 3 depicts the above described fractional write-read technique and generally illustrates how the transfer will occur for a twelve line raster scan. With reference to the previous example of a 512×512 horizontal/vertical picture resolution, the memory required to produce the same data display with the present invention can be reduced from two 512×256 memories to two 512×64 memories, for example. Naturally, any reduction in capacity can be made so long as the reading and writing times from memories 30*a* and 30*b* allow the system to receive and display the data without interruption of the TV image.

As can be seen from the above description, the present invention provides a simple technique for reducing the memory size required to superimpose data in an all-raster scanned CRT display. The normal memory is reduced from a capacity sufficient to store one raster field to a capacity sufficient to store only a fractional part of a field. This reduction in storage area has special significance when multiple shades of gray are used in black-and-white systems, and/or when multiple colors are used in color systems. With the present technique, the same operation can be achieved with a substantial savings of cost and a reduction in the overall power requirements of the system over similar hybrid or stroke-written systems. All of these are advantages that are not taught or suggested in the prior art.

Obviously, many other modifications and variations are possible in light of the above teachings. It is therefore to be understood that within the scope of the appended claims, the invention may be practiced otherwise than as specifically described.

What is claimed is:

1. A system for superimposing data on an all-raster scanned video display comprising:
- means for providing a video signal;
- first memory means for storing data for a fraction of one raster field;
- second memory means for storing data for a successive fraction of the raster field; and
- means for alternately multiplexing the data from said first memory means and the data from said second memory means with said video data to form a video output signal for use in providing a display of the video signal with superimposed data.

2. The system of claim 1 wherein said first and second memory means are constructed to have storage capacities equal to one-half of a raster field.

3. The system of claim 1 further including means for successively storing data representing alternate fractions of a raster field in said first and second memory means.

4. The system of claim 1 further including:
- means for providing a horizontal/vertical sync signal;
- means for generating data to superimpose on said video signal; and
- means responsive to said horizontal/vertical sync signals for writing data representing a fraction of said raster field from said means for generating into one of said first or second memories and providing that data as output to said means for multiplexing while data representing a successive fraction of said raster field from said means for generating is being written into the other of said first or second memories.

5. The system of claim 1 wherein said video signal is an analog video signal and said means for multiplexing is an analog multiplexer.

6. The system of claim 1 wherein each of said memories is a RAM.

7. An all-raster scanned video system comprising:
- means for providing a composite video signal having analog information and horizontal/vertical sync signals;
- means responsive to said composite video for providing an output of said horizontal/vertical sync signals;
- means for providing data to be superimposed on the video signal of a raster-scanned video display;
- means for receiving said data and responsive to the outputs of said horizontal/vertical sync signals for providing and updating successive outputs of data representing the data to be displayed on fractional parts of a raster field;
- first memory means for storing data from said outputs of data representing a fractional part of a raster field;
- second memory means for storing data from said outputs of data representing a successive fractional part of a raster field;
- means responsive to the outputs of said horizontal/vertical sync signals to cause alternate outputs of said data stored in said first and second memory means; and
- multiplexer means for alternately receiving the output of one of said memory means representing data from a fractional part of said raster scan while data for a successive fractional part of said raster scan is being stored in the other of said memory means and combining that output with the video signal for superimposing the data on the video signal.

8. The system of claim 7 wherein said means for providing data alternately provides data for successive fractional parts of each data field for each successive frame of the video signal.

9. A method for superimposing data on the analog video of an all-raster scanned video system comprising:
- providing an analog video signal;
- storing data representing a fraction of the raster field on which data is to be superimposed;
- storing data representing a successive fraction of the raster field on which data is to be superimposed; and
- alternately and successively combining the stored data representing fractional fields with said analog video signal to form successive raster fields and successive frames of a video display having superimposed data.

* * * * *